(12) United States Patent
Atkinson et al.

(10) Patent No.: US 11,939,938 B2
(45) Date of Patent: Mar. 26, 2024

(54) LIQUID LEVEL EQUALIZATION FOR PROPELLANT TANKS

(71) Applicant: Blue Origin, LLC, Kent, WA (US)

(72) Inventors: Claire Jocelyn Atkinson, Corvallis, OR (US); John Michael Dixon, Renton, WA (US)

(73) Assignee: BLUE ORIGIN, LLC, Kent, WA (US)

( * ) Notice: Subject to any disclaimer, the term of this patent is extended or adjusted under 35 U.S.C. 154(b) by 0 days.

(21) Appl. No.: 17/805,591

(22) Filed: Jun. 6, 2022

(65) Prior Publication Data

US 2023/0392567 A1  Dec. 7, 2023

(51) Int. Cl.
*F02K 9/56* (2006.01)
*F02K 9/42* (2006.01)
*F02K 9/60* (2006.01)

(52) U.S. Cl.
CPC .............. *F02K 9/566* (2013.01); *F02K 9/42* (2013.01); *F02K 9/56* (2013.01); *F02K 9/60* (2013.01); *F02K 9/605* (2013.01)

(58) Field of Classification Search
CPC ... F02K 9/42; F02K 9/425; F02K 9/44; F02K 9/56; F02K 9/566; F02K 9/58; F02K 9/60; F02K 9/605
See application file for complete search history.

(56) References Cited

U.S. PATENT DOCUMENTS

| | | | | |
|---|---|---|---|---|
| 2,395,113 | A * | 2/1946 | Goddard | F02K 9/44 60/915 |
| 3,286,463 | A * | 11/1966 | McGroarty | B64G 1/42 222/189.06 |
| 3,492,793 | A * | 2/1970 | Bhuta | B64G 1/50 96/6 |
| 3,601,993 | A | 8/1971 | Bringer | |
| 4,953,440 | A * | 9/1990 | Moscrip | F41A 1/04 89/7 |
| 5,644,920 | A * | 7/1997 | Lak | F02K 9/50 62/48.1 |
| 5,715,675 | A * | 2/1998 | Smith | F02K 9/76 60/257 |
| 5,961,074 | A | 10/1999 | Dunn | |
| 6,016,652 | A * | 1/2000 | Smith | F02K 9/76 60/253 |
| 6,073,450 | A * | 6/2000 | Lak | F17C 5/02 62/7 |
| 9,528,470 | B2 | 12/2016 | Kernilis et al. | |
| 10,718,294 | B1 * | 7/2020 | Zegler | F02K 9/60 |

* cited by examiner

*Primary Examiner* — William H Rodriguez
(74) *Attorney, Agent, or Firm* — Summit Patents PC

(57) ABSTRACT

Systems and methods for equalizing fluid levels within a vent line and a propellant tank in which the vent line is located are discussed herein. The vent line includes a vent valve and an equalization valve. The vent valve can be included in a vent duct of the vent line. The equalization valve is included in a bottom wall (i.e., a low point) of the vent duct of the vent line. A controller is also included in the system to instruct a vent valve and the equalization valve to open and close.

19 Claims, 4 Drawing Sheets

LIQUID LEVEL EQUALIZATION FOR PROPELLANT TANKS

BACKGROUND

Liquids are often used as propellants in propulsion systems on many vehicles such as rockets, spacecraft, aircraft, underwater vehicles, and ground transportation. In a staged rocket including a payload, for example, a second stage (S2) rocket is placed on top of a first stage (S1) rocket. The first stage is ignited at launch. The first stage then burns through the powered ascent until liquid propellants are exhausted. When the first stage engine is extinguished, the second stage separates from the first stage. The second stage engine then ignites and carries the payload into orbit.

During S1 ascent, a S2 liquid propellant vent system experiences significant load due to the buoyancy of a vent line relative to the surrounding liquid propellant within the propellant tank of the rocket's engine system. Liquid propellant can buildup in the vent line due to condensation during S1 ascent and slosh during ascent and the staging transition.

Further, condensation within the vent line can occur due to boil off of the liquid propellant. A portion of the liquid propellant converts to gas because of an increasing temperature within or ambient to the propellant tanks. The gas propellant begins to vent or flow through the vent line. A portion of the vent line, being exposed to colder temperatures, causes the gas propellant to convert back to liquid propellant. The liquid propellant is then trapped in the vent line. This buildup of liquid propellant generates an increased acceleration load on the vent line as the liquid propellant level in the liquid propellant tank falls below the height of a vent duct of the vent line.

Sloshing, or irregular movement of liquid within a container, can occur in rocket engine propellant tanks due to unequal forces being exerted on the rocket, such as during ascent and the staging transition. This can cause the rocket to rotate, shake, or the like. As the liquid propellant sloshes within the propellant tank, some liquid propellant can enter the vent line if a resulting wave is high enough or large enough to reach an input of the vent line. The liquid propellant is then trapped in the vent line. This buildup of liquid propellant generates an increased acceleration load on the vent line as the liquid propellant level in the liquid propellant tank falls below the height of a vent duct of the vent line.

Therefore, it is desirous to reduce the load on the vent line of a rocket or aerospace propellant tank that experiences significant force to provide increased structural margin, to reduce mass of the vent system, or the like. In doing so, it is important to avoid adding any unnecessary mass to the vehicle.

What is needed is a vent line to reduce acceleration loads and improve engine performance.

DETAILED DESCRIPTION

Figure 1B:
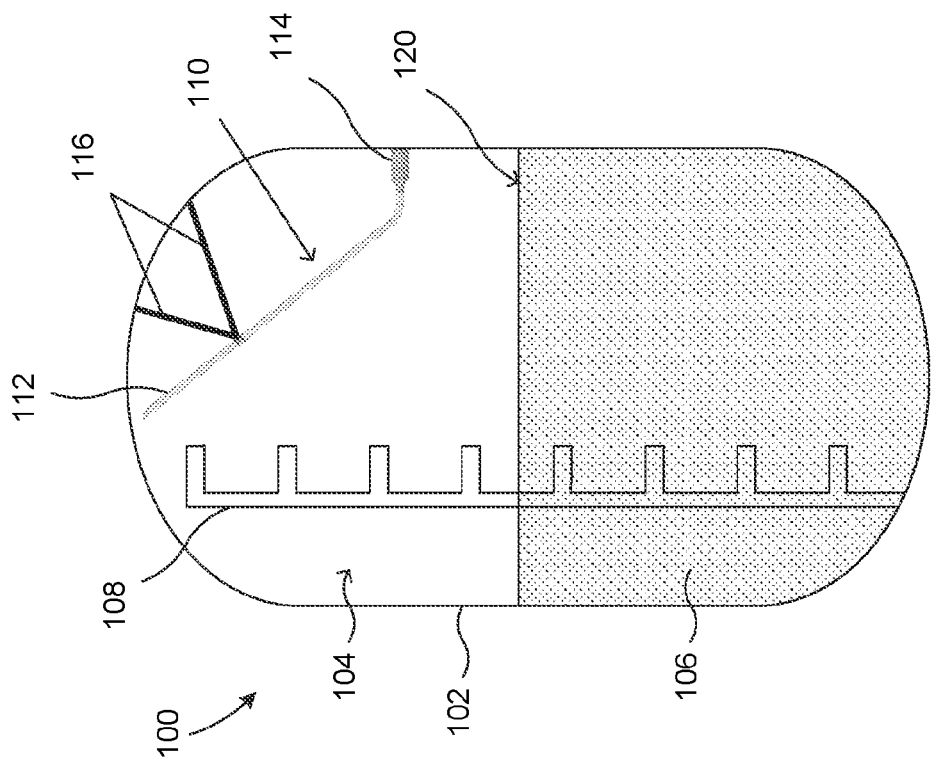
FIG. 1B illustrates a cross-section of the example propellant tank.

Systems and methods for equalizing fluid levels within a propellant tank of a rocket engine are discussed herein. The propellant tank has a vent line located within it and an equalization valve with a controller that vents the system when required (i.e., no venting is nominally needed between vent valve closure before liftoff and the end of the first burn of S2). The disclosed system reduces load on the vent line and allows for increased structural margin, mass reduction of the vent system, or combinations thereof. The vent line includes a vent valve and the equalization valve. The controller is also included in the system to instruct the vent valve and the equalization valve to open and close, when it is necessary or desirous to do so.

The vent valve can be included in a vent duct or a vent tube of the vent line and allows the propellant tank to maintain a pressure within a range of pressures, such as by venting of gaseous propellant from the propellant tank.

The equalization valve is included in a bottom wall (i.e., a low point) of the vent duct of the vent line and allows for flow of a liquid from the vent line into the propellant tank.

Liquid propellants are liquids fed through a system of valves and pipes, such as via a pressure-fed cycle or turbopumps, to a combustion chamber to undergo combustion and generate thrust. The thrust propels a vehicle, such as a rocket, in a desired direction, such as upwards during launch. The vent valve is open during propellant loading (propellant being added to the propellant tank) and the equalization valve is closed to allow for venting and propellant conditioning. After propellant loading and before launch, the vent valve is closed, and the equalization valve is opened. Opening the equalization valve allows any liquid propellant trapped within the vent line to flow into the propellant tank, such that the levels of the liquid propellant within the vent line and the propellant tank (in which the vent line is located) are equal. The equalization valve can also allow liquid to flow into the vent line, such as from the propellant tank. The equalization valve remains open until the level of the liquid propellant within the propellant tank falls below the height of the equalization valve within the propellant. The level of the liquid propellant within the propellant tank and the height of the equalization valve within the propellant tank are measured from the same point of reference, including being measured from or relative to the bottom of the propellant tank in which the liquid propellant and the equalization valve are located. The equalization valve is then closed, and the vent valve is then opened as required to perform normal venting operations.

Equalizing liquid propellant levels within the vent line and the propellant tank neutralizes the buoyancy force and trapped liquid force on the vent line, including on the vent duct, during acceleration (i.e., during launch). Therefore, loads on the vent line are reduced. Fewer structural components are required as the load is reduced, rocket engine mass is reduced, or the load and rocket engine mass are reduced. This reduces loss of available liquid propellant, increases rocket engine performance, or both.

Figure 1A:
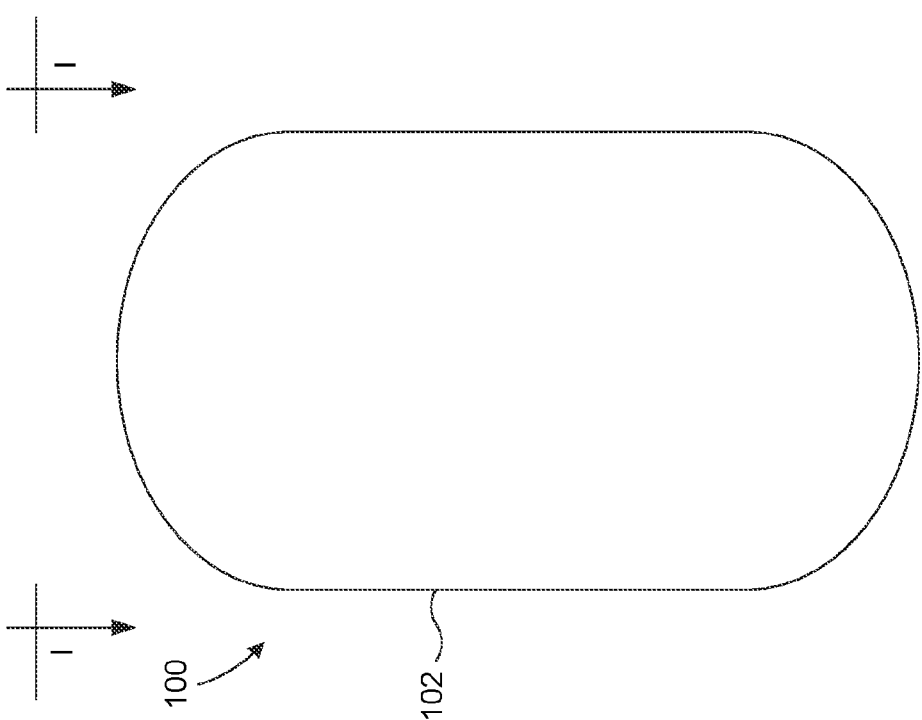
FIG. 1A illustrates an example propellant tank.

FIG. 1A shows a propellant tank 100. FIG. 1B shows a cross-section of the propellant tank 100 taken along the line I-I of FIG. 1A. The propellant tank 100 includes a sidewall 102 forming a cavity 104 to hold a liquid propellant 106. The liquid propellant 106 can be liquid oxygen, liquid hydrogen, liquid fluorine, RP-1, or the like.

The propellant tank 100 can also include a liquid level sensor 108. The liquid level sensor 108 determines a level or height 120 of the liquid propellant 106 stored within the propellant tank 100. The level or height 120 of the liquid propellant 106 can be an absolute height (e.g., a top surface of the liquid propellant 106 is 4 feet high within the propellant tank 100) or a relative height (e.g., the top surface of the liquid propellant 106 within the propellant tank 100 is 6 inches above an equalization valve).

The liquid level sensor 108 can be a rake sensor, a point level measurement sensor, a continuous level transmitter, a reflective level sensor, an ultrasonic level sensor, a flowline level sensor, a submersible sensor, a float level sensor, a vibration fork level, a proximity sensor, the like, or combinations or multiples thereof. The liquid level sensor 108 can be located within the cavity 104 or embedded within the sidewall 102.

The propellant tank 100 also includes a vent line 110. The vent line 110 includes a vent tube 112 connected to a vent duct 114. The propellant tank 110 can also include a brace 116 to support the mass of the vent line 110 (including when the vent line 110 has liquid propellant 106 trapped therein), to adjoin or affix the vent line 110 to the sidewall 102, or both.

Figure 2:
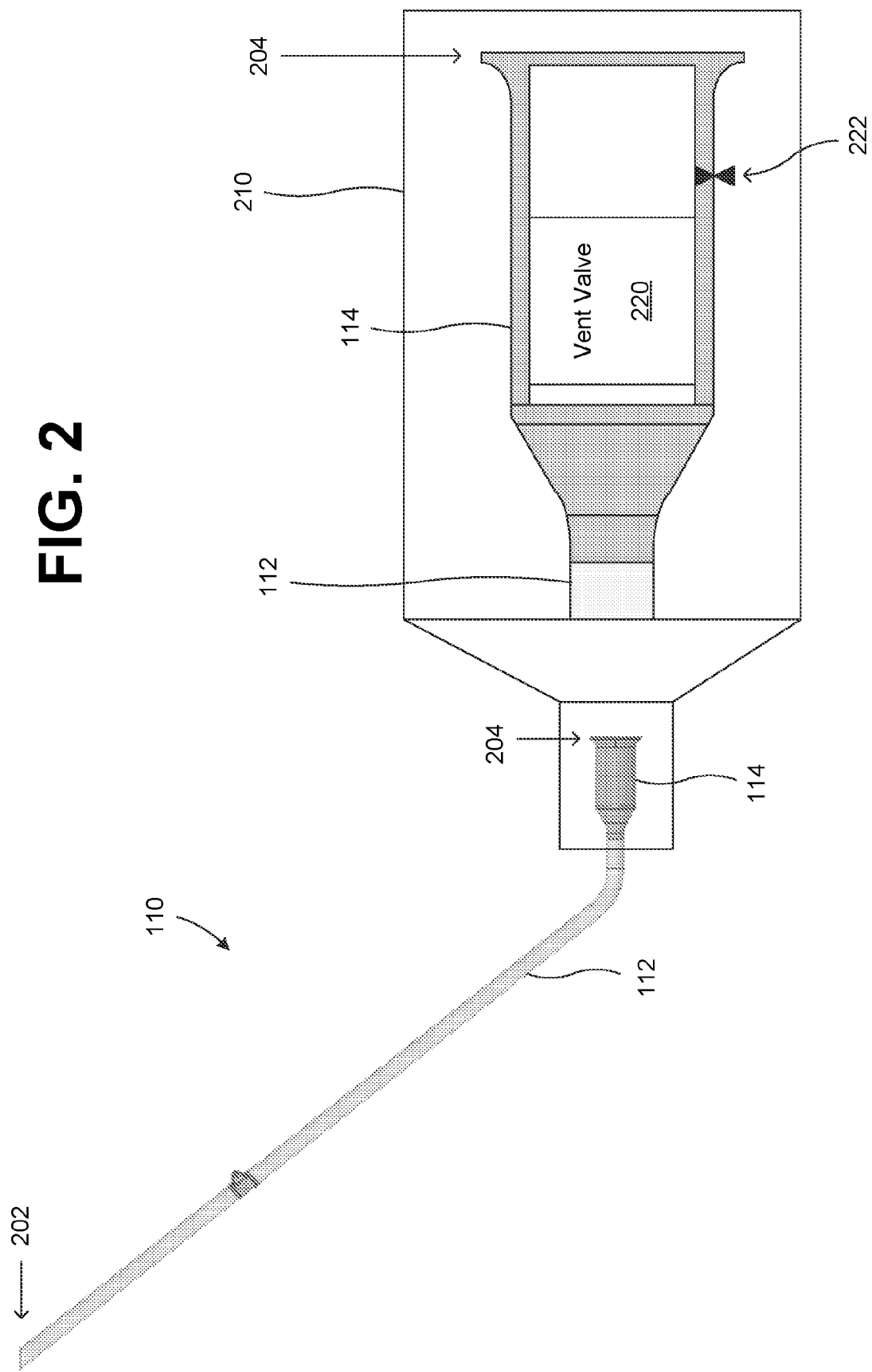
FIG. 2 illustrates an example vent line of the example propellant tank.

FIG. 2 shows the vent line 110 of the propellant tank 100. Magnified view 210 shows the vent duct 114 with a wall or cover having been removed therefrom to view an internal cavity of the vent duct 114.

The vent tube 112 includes an open end 202. The open end 202 is exposes the internal volume of the vent line 112 to the cavity 104 of the propellant tank 100. The vent duct 114 is connected to the vent line 110 at an output, which is an end opposing the open end 202 and lower than the open end 202.

The vent duct 114 includes an exhaust 204 from which excess pressure of the propellant tank 100 can be expelled. The open end 202 can be in fluid communication with the exhaust 204 when a vent valve 220 is open. The vent valve 220 allows the propellant tank to maintain a pressure within a range of pressures, such as by venting of gaseous propellant from the propellant tank.

The vent duct 114 also includes an equalization valve 222 at a low point. The equalization valve 222 allows the levels of the liquid propellant within the vent line 112 and the cavity 104 of the propellant tank 100 to be equalized. The height of the liquid propellant within the vent line 112 is the same as the height of the liquid propellant within the cavity 104 of the propellant tank 100 until the height of the liquid propellant falls below the height of the equalization valve 222. Once the height of the liquid propellant falls below the equalization valve 222, then the equalization valve 222 does not include any more liquid propellant or includes a minimal or negligible amount.

The low point is a point below a midline of the vent duct 114, including the bottom-most point of the vent duct 114 (e.g., in a bottom vent wall or a bottom portion of a vent wall forming the vent duct 114). The equalization valve 222 allows for flow of a liquid propellant from the vent duct 114 of the vent line 110 into cavity 104 of the propellant tank 100. When the equalization valve 222 is open, the vent duct 114 can be in fluid communication with the cavity 104 of the propellant tank 102.

The vent valve 220 can be a solenoid valve, a ball check valve, a diaphragm check valve, a swing check valve, a tilting disk check valve, a lift check valve, a duckbill valve, a valve that closes or remains closed when an internal pressure of a propellant tank is less than or equal to a predetermined amount and that opens or remains open when the internal pressure of the propellant tank is greater than or equal to the predetermined amount, the like, or combinations or multiples thereof. The predetermined amount can be, for example, from 14.5 to 145 psi.

The equalization valve 222 can be a solenoid valve, a duckbill valve, a valve that closes or remains closed when an internal pressure of a propellant tank is less than or equal to a predetermined amount and that opens or remains open when the internal pressure of the propellant tank is greater than or equal to the predetermined amount, the like, or combinations or multiples thereof. The predetermined amount can be, for example, from 14.5 to 145 psi.

Figure 3:
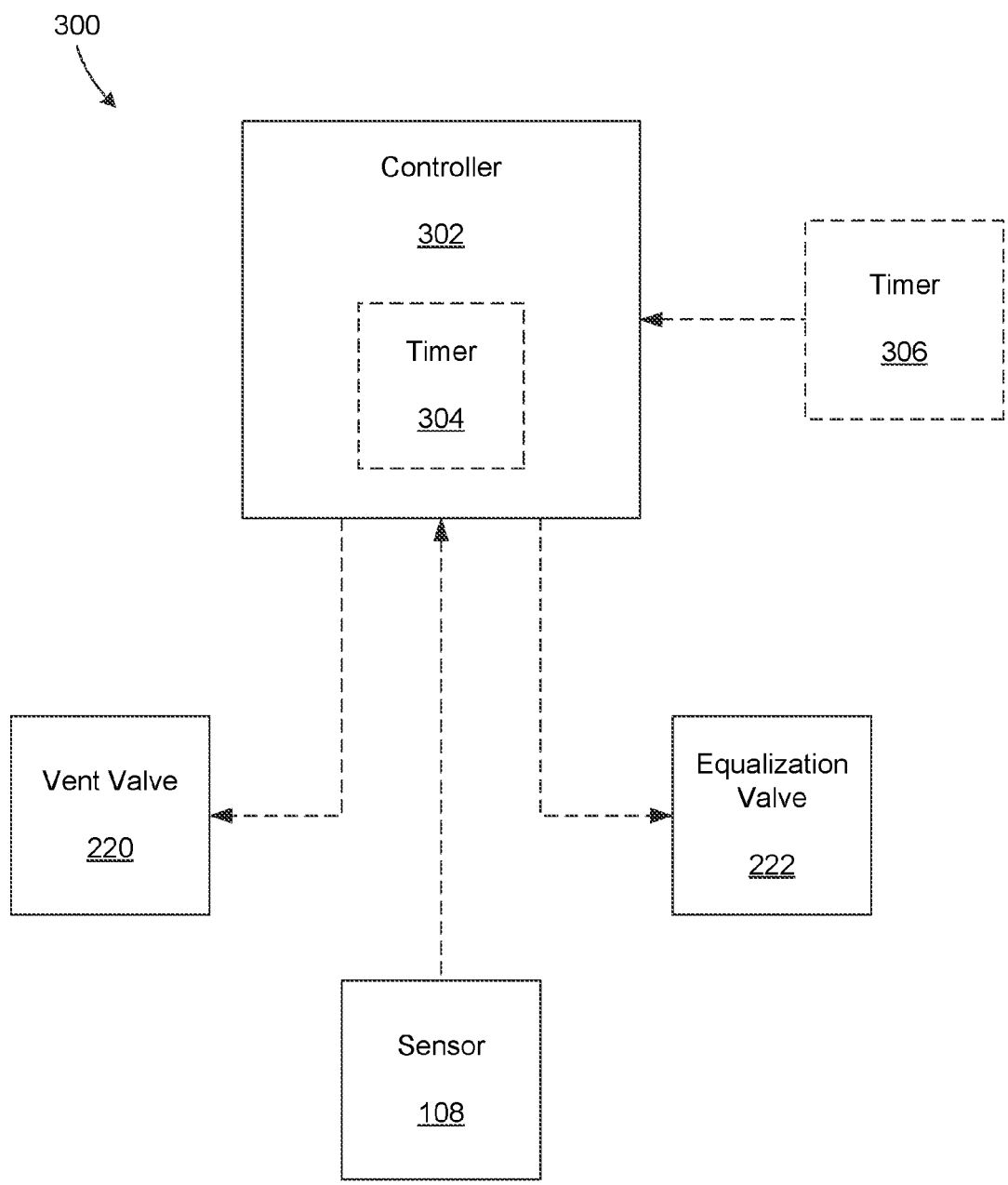
FIG. 3 illustrates an example block diagram control system for equalizing propellant tank vent lines.

FIG. 3 shows a control system 300. The control system 300 includes a controller 302, the vent valve 220, and the equalization valve 222. The controller 302 controls the opening and closing of the vent valve 220 and the equalization valve 222 based on operating parameters. The operating parameters can be obtained via a sensor, via user input, via a timer, the like, or combinations or multiples thereof.

The controller 302 can include a timer 304, can be electrically connected to a timer 306 external to the controller 302, or both. The timer 306, being electrically connected to the controller 302, can send the signal directly to the controller 302 or indirectly to the controller 302 via one or more other components (i.e., via a storage medium, via a processor, or the like). The timer 306 can be electrically connected to the controller 302. The controller 302 can be connected to the timer 306 via a wired or wireless connection. The timer 304, 306 indicates a current time or a passage of a predetermined amount of time. The timer 304, 306 is configured to send a signal to the controller at a designated time after launch of a rocket when the liquid level of the propellant is expected to be below the equalization valve within the propellant tank. The designated time can be based on a rate of liquid propellant use of the current launch, on an average rate of liquid propellant use from one or more previous launches, from a manually set timer, or the like.

In response to receiving the signal, the controller 302 can send an instruction to the vent valve 220, an instruction to the equalization valve 222, or both. The instructions can cause the vent valve 220 and the equalization valve 222 to open or close, when it is desirous or necessary for the valves 220, 222 to do so.

The control system 300 can also include the sensor 108. The sensor 108, being electrically connected to the controller 302, can send the signal directly to the controller 302 or indirectly to the controller 302 via one or more other components (i.e., via a storage medium, via a processor, or the like). The controller 302 can be electrically connected to the sensor 108 via a wired or wireless connection. The sensor 108 can send a signal including data directed to the level of the liquid propellant within the propellant tank. In response to receiving the signal, the controller 302 can send an instruction to the vent valve 220, an instruction to the equalization valve 222, or both. The instructions can cause the vent valve 220 and the equalization valve 222 to open or close, when it is desirous or necessary for the valves 220, 222 to do so.

In one example, the controller 302 can send instructions to the vent valve 220 and the equalization valve 222 at predetermined times. For instance, t represents an arbitrary point in time. During propellant loading ($t<-1$), the vent valve 220 is open and the equalization valve 222 is closed. At $t=-1$, the controller 302 sends an instruction via a signal to the vent valve 220 to close and an instruction via a signal to the equalization valve 222 to open. At $t=0$, rocket launch is initiated. At a time (t) when the liquid level of the propellant is expected to be below the height of the equalization valve 222 (i.e., at some time when t>0), the controller 302 can, in one example, send an instruction via a signal to the vent valve 220 to open and an instruction via a signal to the equalization valve 222 to close.

In another example, the controller 302 can send instructions to the vent valve 220 and the equalization valve 222 at predetermined times and based on received sensed data or information. For instance, t represents an arbitrary point in time. During loading (t<−1), the vent valve 220 is open and the equalization valve 222 is closed. At t=−1, the controller 302 sends an instruction via a signal to the vent valve 220 to close and an instruction via a signal to the equalization valve 222 to open. At t=0 (where t represents a point in time), rocket launch is initiated. At some time when t>0, a sensor of the propellant tank determines that the liquid level of the propellant is below the height of the equalization valve 222. The sensor sends a signal to the controller 302 that the liquid level of the propellant is below the equalization valve 222. The sensor, being electrically connected to the controller, can send the signal directly to the controller 302 or indirectly to the controller via one or more other components (i.e., via a storage medium, via a processor, or the like). In response to the signal from the sensor based on the sensed data, the controller 302 can, in one example, send an instruction via a signal to the vent valve 220 to open and an instruction via a signal to the equalization valve 222 to close.

Figure 4:
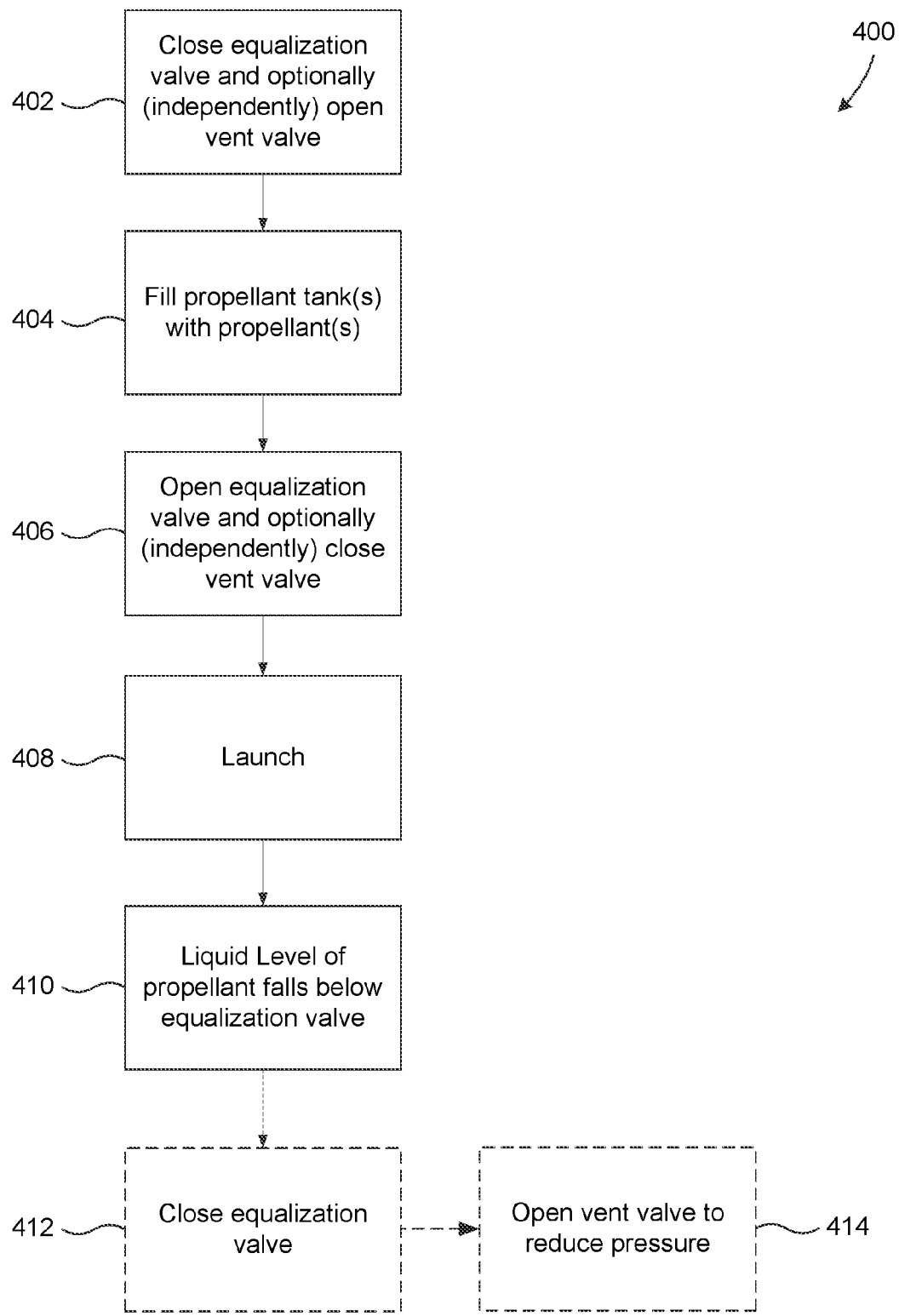
FIG. 4 illustrates a method for equalizing liquid levels in an example propellant tank.

FIG. 4 shows a method for equalizing liquid levels in a propellant tank. At 402, the vent valve is opened or remains open and the equalization valve is closed or remains closed. At 404, the propellant tank is filled with propellant. For example, a predetermined volume of liquid propellant can be added to the propellant tank (e.g., a set number of liters). As another example, a liquid propellant can be added until the liquid propellant reaches a certain height within the propellant tank, fills a certain percentage of the propellant tank volume, increases the mass of the propellant tank by a given amount, or the like.

At 406, after the propellant tank is filled, the vent valve is closed, and the equalization valve is opened. The valves can be opened and closed manually or by a controller. The controller can send instructions to the respective valves to open and close based on a timer sequence, an operating parameter, or the like.

For example, the time after launch can be based on a pre-determined schedule (e.g., minutes or hours after launch). The pre-determined schedule can be based on an anticipated time when the liquid level of the propellant is expected to be below the equalization valve within the propellant tank (e.g., based on liquid propellant level data from previous launches or testing).

As another example, the signal can also be sent to the controller 302 manually, such as by user input. An operator can instruct the controller to open and close the vent valve 220 and the equalization valve 222 after a given amount of time has passed after launch, based on received data (e.g., level of the liquid propellant within the propellant tank), or the like.

At 408, rocket launch is initiated. To launch, liquid propellant is flowed or moved into a combustion chamber to undergo combustion. This combustion generates exhaust which is forced through a nozzle to generate thrust. The thrust is a force that causes upwards propulsion of the rocket, such as during launch.

At 410, the level of a liquid propellant falls below the equalization valve. The level of the liquid propellants falls as the liquid propellant is flowed or moved from the propellant tank and into the combustion chamber to undergo combustion. In one example, the liquid propellant is that of a first stage rocket (i.e., the propellant is the propellant used to launch the rocket). In another example, the liquid propellant is that of a second stage rocket (i.e., the propellant is the propellant of a second stage which undergoes combustion after the staging transition). The level of the liquid propellant can be determined by a sensor or a timer (i.e., at a time when the liquid level of the propellant is expected to be below the height of the equalization valve based on calculations of rate of liquid propellant use or based on rate of liquid propellant use data of previous launches).

At 412, the equalization valve can be closed. The rocket continues to its destination or to complete its mission (e.g., deliver a payload into orbit).

At 414, the vent valve can be opened to reduce tank pressure at various times during the mission.

In one example, the propellant tank is filled with liquid propellant. During loading (t<−1, where t represents an arbitrary point in time), the vent valve is open, and the equalization valve is closed. At t=−1, the vent valve is closed, and the equalization valve is opened. The valves can be opened and closed, respectively, manually or via instructions from a controller based on a timer sequence, an operating parameter, the like, or combinations or multiples thereof. At t=0, rocket launch is initiated. Liquid propellant is flowed or moved into a combustion chamber to undergo combustion. This combustion generates exhaust which is forced through a nozzle to generate thrust. The thrust is a force that causes upwards propulsion of the rocket during launch. At a time "t" where the liquid level of the propellant is expected to be below the height of the equalization valve (i.e., t>0), the controller sends an instruction via a signal to the vent valve to open and an instruction via a signal to the equalization valve to close. The time t where the liquid level of the propellant is expected to be below the height of the equalization valve can be determined based on calculations of rate of liquid propellant use (i.e., calculated by determining the amount of liquid propellant used over a given amount of time) or based on rate of liquid propellant use data of previous launches (i.e., calculated by determining the average amount of liquid propellant used over a given amount of time based one or more previous launches).

In another example, the propellant tank is filled with liquid propellant. During loading (t<−1, where t represents an arbitrary point in time), the vent valve is open, and the equalization valve is closed. At t=−1, the vent valve is closed, and the equalization valve is opened. The valves can be opened and closed, respectively, manually or via instructions from a controller based on a timer sequence, an operating parameter, the like, or combinations or multiples thereof. At t=0, rocket launch is initiated. Liquid propellant is flowed or moved into a combustion chamber to undergo combustion. This combustion generates exhaust which is force through a nozzle to generate thrust. The thrust is a force that causes upwards propulsion of the rocket during launch. At t>0, a sensor of the propellant tank determines that the liquid level of the propellant is below the height of the equalization valve. The sensor sends a signal to the controller that the liquid level of the propellant is below the equalization valve. The sensor, being electrically connected, can send the signal directly to the controller or indirectly to the controller via one or more other components (i.e., via a storage medium, via a processor, or the like). In response to signal from the sensor based on the sensed date, the controller sends an instruction via a signal to the vent valve to open and an instruction via a signal to the equalization valve to close.

Embodiments of the invention can include a non-transitory computer readable medium, which can store instructions for performing the above-described methods and any steps thereof, including any combinations of the same. For example, the non-transitory computer readable medium can store instructions for execution by one or more processors or similar devices.

Further embodiments of the present invention can also include the one or more components which read out and execute computer executable instructions, such as a non-transitory computer-readable medium, recorded or stored on a storage medium, to perform the functions of any embodiment. The controller may include one or more of a central processing unit (CPU), micro processing unit (MPU), or other circuitry, such as a processor. The computer executable instructions may be provided to the controller from the storage medium.

Though certain elements, aspects, components or the like are described in relation to one embodiment or example of a rocket, those elements, aspects, components or the like can be including with any other rocket, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A method for equalizing fluid levels of a propellant tank that stores a liquid propellant for a rocket engine of a rocket, the propellant tank having a vent line with a vent valve and an equalization valve, the method comprising:
    after filling the propellant tank with the liquid propellant to a level above a height of the equalization valve within the propellant tank before launch of the rocket:
    using one or more controllers to:
        determine the level of the liquid propellant relative the height of the equalization valve within the propellant tank after the launch of the rocket;
        in response to the level of the liquid propellant falling below the level of the equalization valve, open and close the vent valve to re-duce pressure of the propellant tank; and
        in response to the level of the liquid propellant falling below the equalization valve during or after the launch of the rocket, close the equalization valve.

2. The method of claim 1, wherein one of the one or more controllers further performs the method by, upon or after receiving a signal from a timer at a designated time after the launch of the rocket, opening the vent valve and closing the equalization valve.

3. The method of claim 2, wherein the designated time after the launch of the rocket is determined based on calculating a rate of liquid propellant use during the launch of the rocket and the rate of liquid propellant use after the launch of the rocket calculated based on an amount of the liquid propellant used over a given amount of time after the launch of the rocket.

4. The method of claim 2, wherein the designated time after the launch of the rocket is determined based on calculating an expected rate of liquid propellant based on liquid propellant use data of previous launches, the expected rate of liquid propellant used being calculated based on an average of an amount of the liquid propellant used over a given amount of time of one or more of the previous launches.

5. The method of claim 1, wherein one of the one or more controllers further performs the method by:
    closing the vent valve before the launch of the rocket and after the propellant tank is at least partially filled with the liquid propellant above the equalization valve; and
    opening the equalization valve before the launch of the rocket and after the propellant tank is at least partially filled with the liquid propellant above the equalization valve.

6. The method of claim 1, wherein one of the one or more controllers further performs the method by detecting the level of the liquid propellant based on a signal received from a sensor, the signal including sensed level data of the level of the liquid propellant.

7. The method of claim 1, wherein one of the one or more controllers further performs the method by causing the vent valve and the equalization valve to close in response to receiving sensed level data, the sensed level data being associated with the level of the liquid propellant being below a physical location of the equalization valve.

8. A vent line, comprising:
    a vent valve having a vent pressure range;
    an equalization valve structured to cause a liquid propellant to be released from the vent line into a propellant tank; and
    a controller configured to:
        determine when a level of the liquid propellant within the propellant tank is below a height of the equalization valve within the propellant tank, and
        when the level of the liquid propellant falls below the equalization valve, send an instruction to:
            cause the vent valve to open from a closed position and to close from an open position, the opening and closing to reduce pressure of the propellant tank, and
            cause the equalization valve to close from an open position.

9. The vent line of claim 8, wherein the controller is further configured to:
    before launch of the rocket and after the propellant tank is at least partially filled with the liquid propellant above the height of the equalization valve:
        causing the vent valve to close from the open position; and
        causing the equalization valve to open from a closed position.

10. The vent line of claim 8, wherein the controller is electrically connected to a sensor, the sensor configured to detect the level of the liquid propellant within the propellant tank.

11. The vent line of claim 10, wherein the controller is further configured to determine the level of the liquid propellant based on a signal received from the sensor, the signal including the level of the liquid propellant within the propellant tank.

12. The vent line of claim 10, wherein the sensor is a rake sensor, a point level measurement sensor, a continuous level transmitter, a reflective level sensor, an ultrasonic level sensor, a flowline level sensor, a submersible sensor, a float level sensor, a vibration fork level, a proximity sensor, or combinations or multiples thereof.

13. The vent line of claim 8, wherein the controller is electrically connected to an external timer, the external timer being configured to send a signal to the controller at a time after launch of a rocket when the level of the liquid propellant is expected to be below the equalization valve.

14. The vent line of claim 13, wherein the time after launch of the rocket is determined based on calculations of rate of liquid propellant use or based on rate of liquid propellant use data of previous launches.

15. The vent line of claim 8, wherein the controller further comprises a timer to indicate a time after launch of a rocket when the level of the liquid propellant is expected to be below the equalization valve.

16. The vent line of claim 15, wherein the time after launch of the rocket is determined based on calculations of rate of liquid propellant use or based on rate of liquid propellant use data of previous launches.

17. The vent line of claim 8, further comprising a vent duct including a vent wall having a bottom portion, the bottom portion including the equalization valve.

18. The vent line of claim 17, further comprising a vent tube including an open end and an output, the output being connected to the vent duct and being an end opposing the open end and lower than the open end.

19. The vent line of claim 8, wherein the level of the liquid propellant and the height of the equalization valve are measured from a bottom of the propellant tank in which the liquid propellant and the equalization valve are located.

* * * * *